May 31, 1938.    J. J. GREBE    2,118,842
CONTROL SYSTEM
Filed April 30, 1935    4 Sheets-Sheet 1

Inventor:
John J. Grebe
By Cornelius L. Ehret
Attorney.

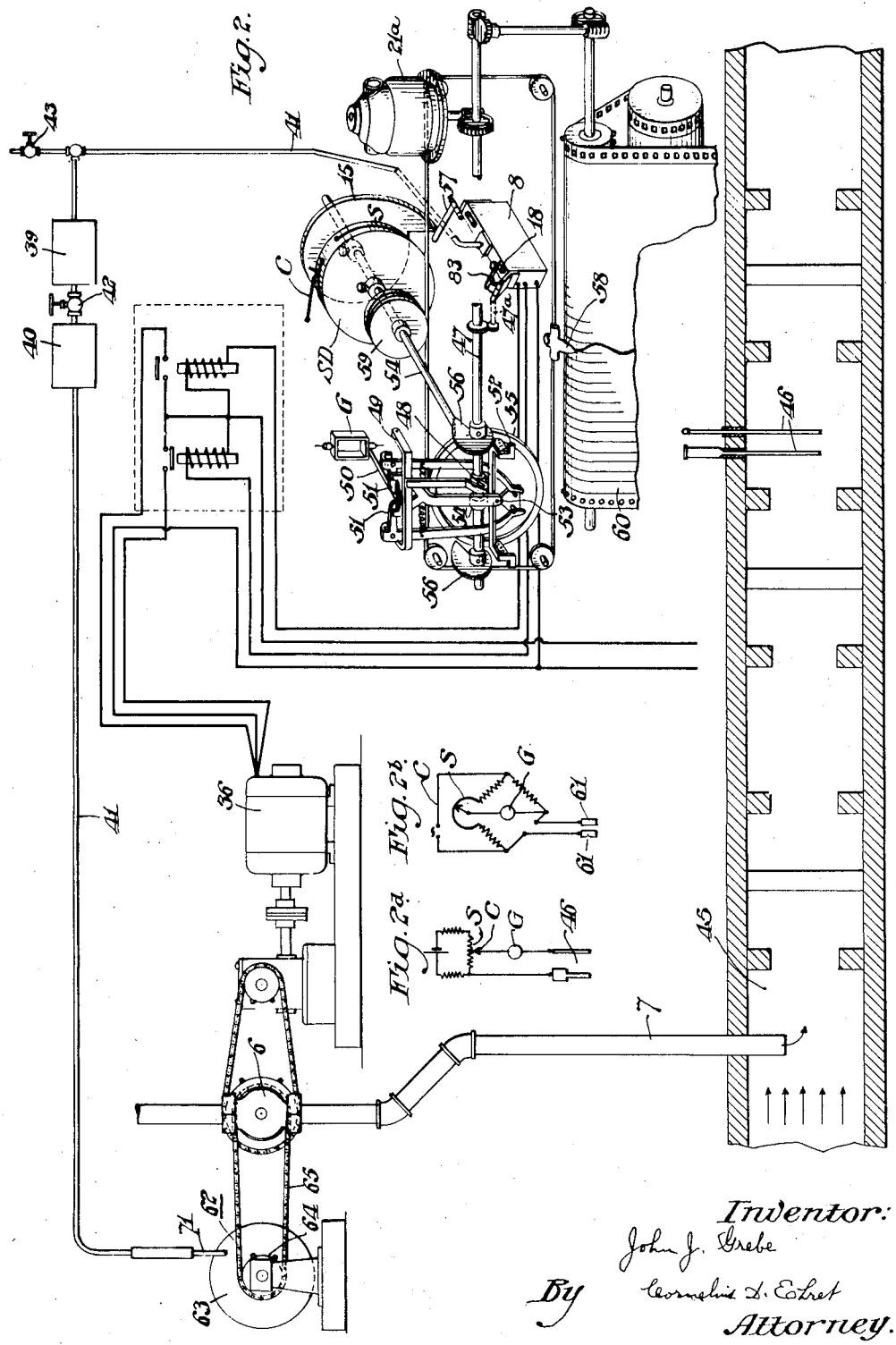

May 31, 1938.   J. J. GREBE   2,118,842
CONTROL SYSTEM
Filed April 30, 1935   4 Sheets-Sheet 3
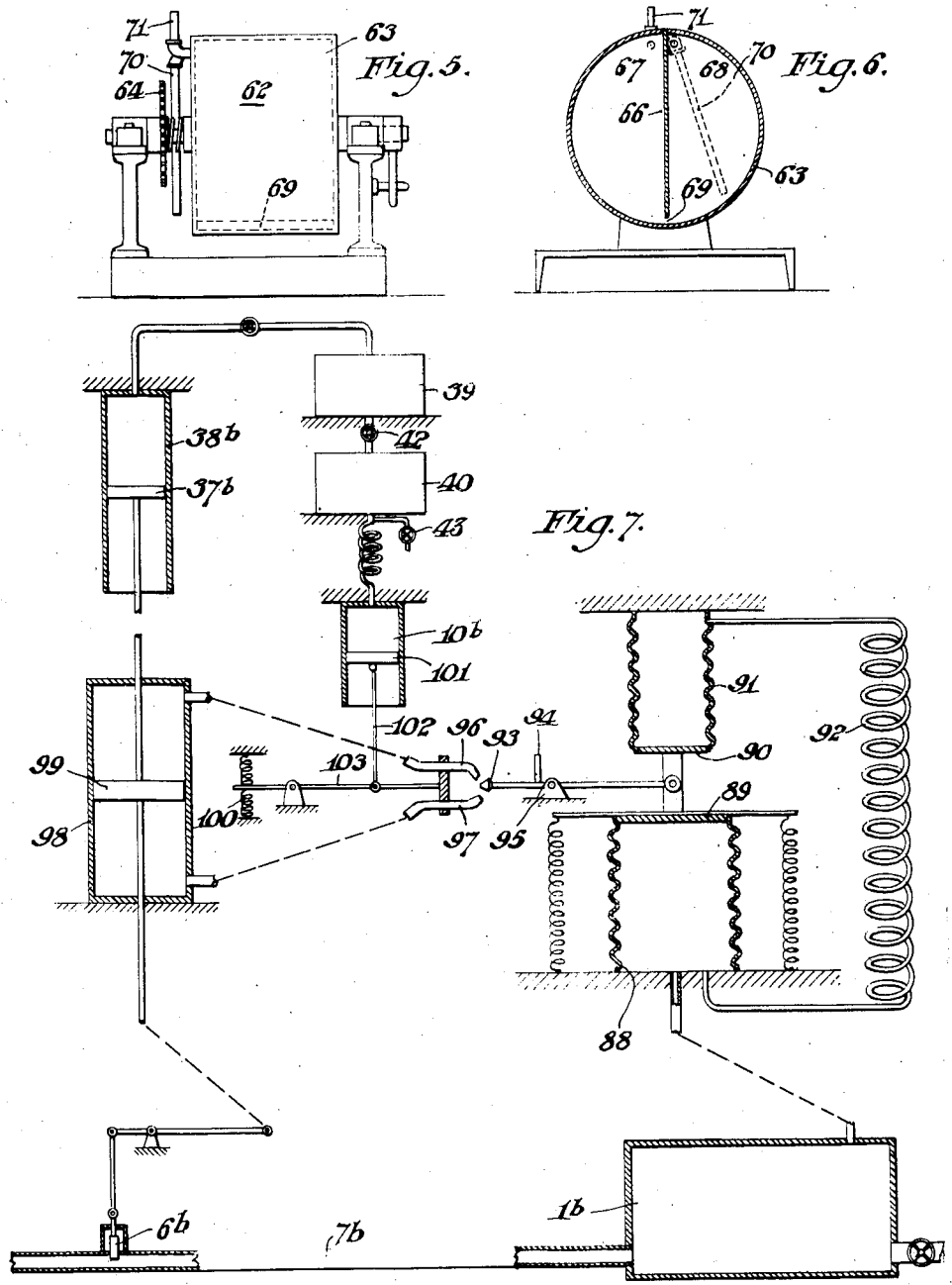
Inventor:
John J. Grebe
Cornelius L. Ehret
By   Attorney.

Patented May 31, 1938

2,118,842

UNITED STATES PATENT OFFICE 2,118,842

CONTROL SYSTEM

John J. Grebe, Midland, Mich., assignor to The Dow Chemical Company, Midland, Mich., a corporation of Michigan Application April 30, 1935, Serial No. 19,124

21 Claims. (Cl. 236—1)

My invention relates to methods of and apparatus for controlling application of an agent to determine or maintain the magnitude of a condition.

In accordance with my invention, upon departure of the magnitude of a condition from a normal or desired value, there is produced a control effect, of magnitude determined by the extent of said departure, which is utilized to effect operation of a control member in proper sense to return the magnitude of the condition toward normal, the movement of the control member producing a second control effect in opposition to the first control effect and whose magnitude is a function of the rate of movement of the control member.

Further in accordance with my invention there is produced a third control effect whose magnitude is a function of the rate of change of the condition, the concurrent magnitudes of the three control effects determining the sense and rate of adjustment of the control member.

My invention further resides in the methods and systems hereinafter described and claimed.

For an understanding of my invention and for illustration of the various modifications thereof, reference is to be had to the accompanying drawings, in which:

Figure 1 diagrammatically represents a temperature control system;

Fig. 2 diagrammatically illustrates a system of control of a chemical process or treatment;

Fig. 2a illustrates diagrammatically the fundamental measuring circuit of the system of Fig. 2;

Fig. 2b illustrates a Wheatstone bridge type of measuring circuit;

Fig. 5 is a detail view, on enlarged scale, of pump mechanism shown in Fig. 2;

Fig. 6 is an end view, in section, of the pump of Fig. 5;

Figure 8:
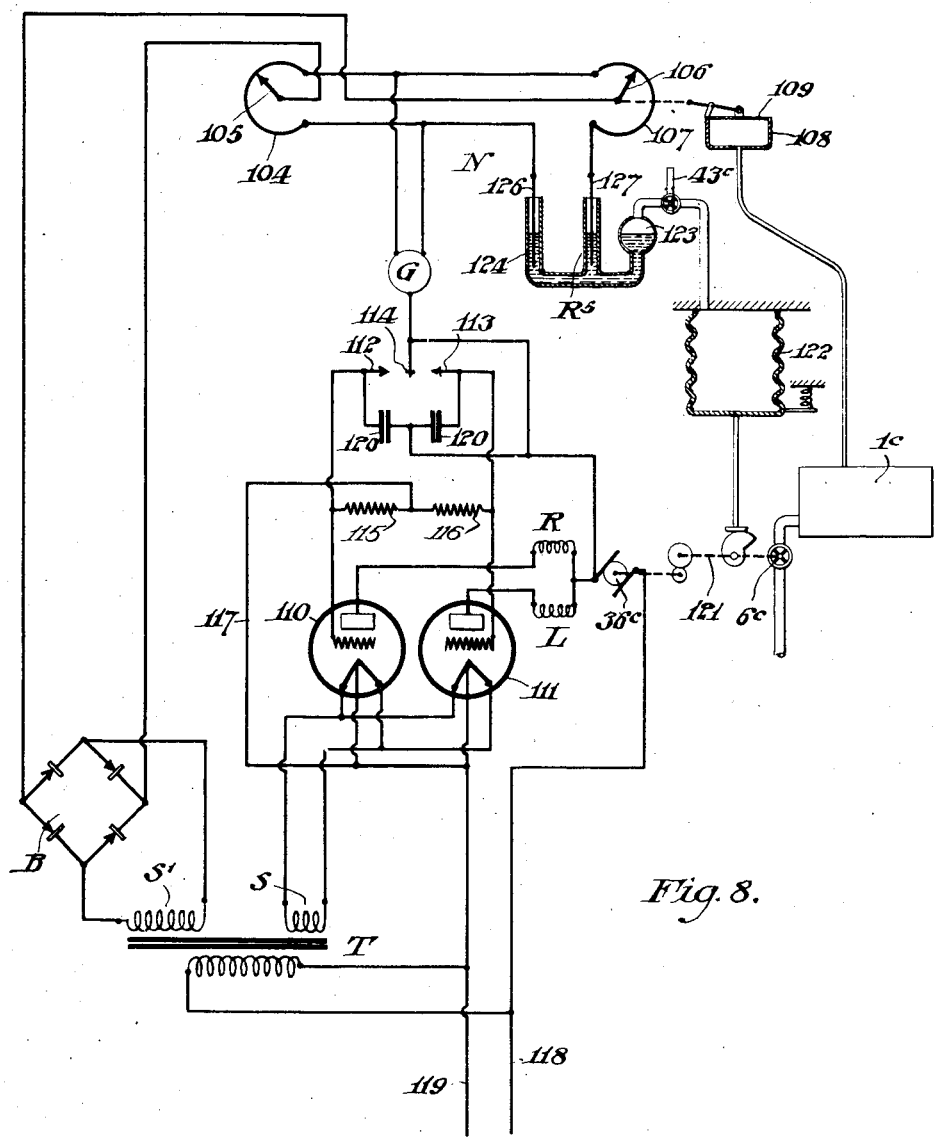

Figs. 7 and 8 diagrammatically illustrate other forms of control apparatus.

In general, any system for controlling the magnitude of a condition, as pressure, temperature, speed, acidity, alkalinity, etc., must include a detector responsive to changes in magnitude of a condition and a control member adjustable to vary application of an agent affecting the magnitude of the condition. In many systems, when a departure from the desired magnitude of the condition is detected and the control member adjusted, there elapses a substantial period of time before the effect of control adjustment is apparent to the detector. This time lag is due to any one or more factors, as velocity, reaction time, storage capacity, etc., depending upon the nature or construction of the system and the conditions of operation.

Figure 1:
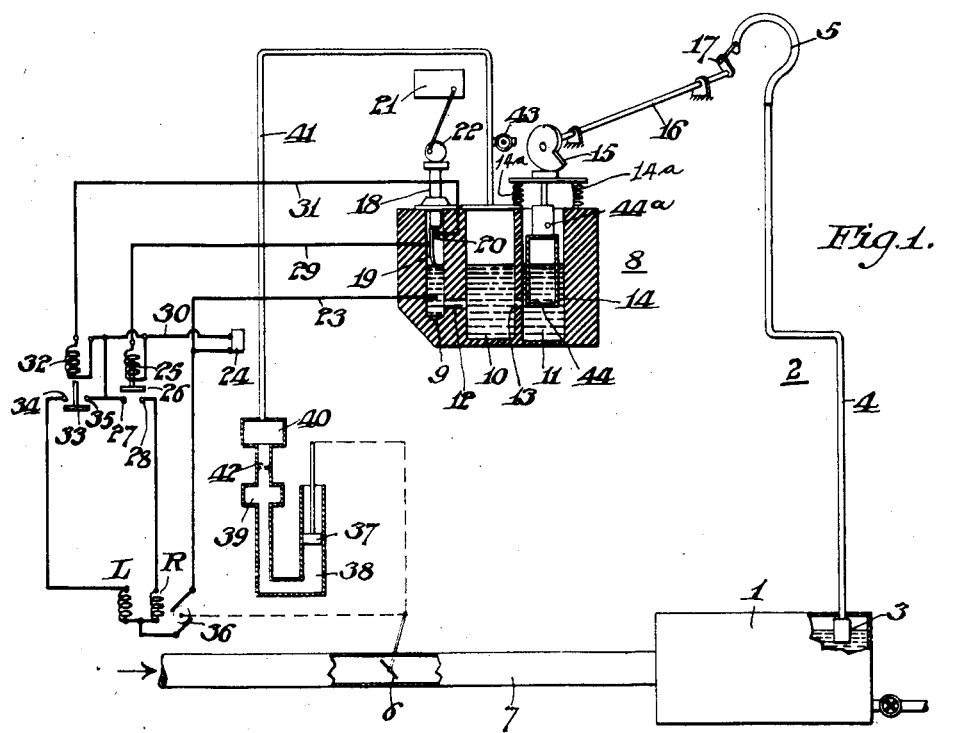

Referring to Fig. 1 as an example of a system of this type, it is desired that the temperature within the tank 1 shall be held constant. The detector 2, specifically shown, consists of a bulb 3 disposed within tank 1 and filled with a volatile fluid. The bulb is connected as by pipe 4 to a Bourdon tube 5 or other suitable pressure-responsive device. Supply of a hot fluid, as steam, to the tank 1 is controlled by a valve 6 in the intake pipe 7.

It is assumed that the temperature has risen above a desired value and that the detector 2 has started to close the valve 6. Due to the distance of the valve from the tank, the resistance offered by pipe 7 to the flow of the steam, the heat storage of the steam already in the tank and of the tank itself, as well as other factors, a substantial time elapses after the valve has begun to close before the detector notices a drop in the temperature due to the reduced heat input. In the meantime, therefore, the detector has continued to effect closing of the valve with the result that when the detector recognizes that the temperature has returned to normal and stops further closing of the valve, the rate of supply of steam is then insufficient to maintain the tank temperature which theretofore continues to decrease. The detector consequently responds to start opening movement of the valve 6, and the cycle of oscillation repeats. This undesirable mode of operation is avoided by interposing between the detector and the valve a control arrangement, now described, which takes cognizance of the time lag of the system.

The control device 8 comprises three chambers 9, 10 and 11 which are interconnected by the passages 12 and 13 and contain an electrically conductive fluid, preferably mercury. The position of the plunger 14 in chamber 11 is determined by cam 15 suitably connected as by the rod 16 and link 17 to the movable element 5 of the detector. Therefore, as the temperature of tank 1 increases or decreases, the position of plunger 14 is lowered or raised correspondingly to vary the level of the mercury in the chambers; specifically, in the arrangement shown, the level of the mercury is raised when the temperature increases and vice versa.

The plunger 18, reciprocable in chamber 9, carries two contacts 19 and 20 which are insulated from each other. The plunger 18 is constantly reciprocated by any suitable mechanism, for example, the motor 21 which drives the cam 22, or equivalent, at suitable speed, for example, one revolution every few seconds. When the mercury is at its normal level, the contact 19 is in engagement with the mercury, and the contact 20 is out of engagement with the mercury, throughout the stroke of plunger 18. When the mercury is above its normal level, the contact 20 engages the mercury for part of the stroke of the plunger 18, the period of engagement being greater, in each cycle of the plunger movement, the higher the mercury level is above normal. Conversely, when the mercury level in chamber 9 is below normal, the contact 19 is out of engagement with the mercury for part of each stroke of the plunger, the lower the mercury below normal level the longer the portion of each cycle of plunger 18 that contact 19 is out of engagement with the mercury.

The mercury within the device 8 is connected by conductor 23 to one side of a source of current 24. The contact 19 is connected by conductor 29 to one terminal of the relay coil 25 whose other terminal is connected by conductor 30 to the other pole of the current source 24. Therefore, so long as the mercury level is at or above normal the relay coil 25 is energized and the movable contact 26 of the relay is maintained out of engagement with the contacts 27, 28. The contact 20 of plunger 18 is connected by conductor 31 to one terminal of the relay coil 32 whose other terminal is connected to conductor 30. So long as the mercury level in device 8 is at or below normal, the relay coil 32 is deenergized, and the relay contact 33 remains out of engagement with the contacts 34 and 35.

The motor 36 for operating the valve 6 through a suitable speed reducing mechanism, not shown in Fig. 1, is of the reversible type having two fields R and L in series with the motor armature. When the field R is energized the motor rotates in a direction which effects opening of valve 6, and when field L is energized the motor rotates to effect closing movement of the valve. The circuit of the field R is controlled by the movable contact 26 of the relay 25, and the circuit of the field L is controlled by contact 33 of the relay 32.

So long as the mercury level is at the normal height, contact 19 remains in engagement with the mercury continuously energizing the relay coil 25 thereby maintaining the circuit of the field R open, and contact 20 remains continuously out of engagement with the mercury so that no current flows through the relay coil 32, and the circuit of the field coil L also remains open. If the mercury level drops, the contact 19 is out of engagement with the mercury for a portion of each stroke of the plunger 18 and the contact 26 therefore intermittently closes the circuit of the field coil R of motor 36 to effect opening movement of the valve. If, on the other hand, the mercury level rises above normal value, the contact 20 engages the mercury for part of each stroke of the plunger 18, intermittently to effect circuit-closing movement of contact of relay 32 to energize the field L of the motor 36 thereby to effect a valve-closing movement. The greater the departure from normal in either direction, the longer the relay contact 33 or 26 remains in engagement with its cooperating contacts for each stroke of the plunger 18, and the greater the speed of the motor 36 for a given period of time.

Contacts 19 and 20 and the relays constitute, in effect, a reversing switch for motor 36, affording periods of energization whose duration is a function of the change of the mercury level in chamber 9 from normal.

Between the valve 6 and the device 8 is operatively interposed an arrangement which, as a result of movement of the valve, produces a change in the mercury level independently of movement of plunger 14 by the detector 2 in response to the effect of the changed rate of supply of the steam. In the arrangement specifically shown, the valve 6 is connected to the piston 37 or equivalent so that movement of the valve produces a change in pressure in the system including the chamber 38, storage tanks 39 and 40 and chamber 10 of the control device 8 which is connected to the storage tank 40 by pipe 41. Between the storage tanks 39 and 40, the path is suitably restricted as, for example, by an orifice plate 42. A bleeder port or valve 43 affords communication to or from atmosphere from chamber 10.

Again assuming that the temperature of tank 1 has increased above normal value, the plunger 14 is moved downwardly against the bias of springs 14a by the detector to raise the level of the mercury in device 8, whereupon the motor 36 is energized to initiate a closing movement of the valve 6. As the valve begins to move, the plunger 37 or equivalent is moved to decrease the pressure in chamber 10 so that, after a time, determined by constants or adjustments of the pneumatic system, and preferably less than the time lag of the system, the mercury level in chamber 9 falls, tending to reduce the speed of motor 36 and eventually to stop the valve motor. The greater the speed of movement of the valve, the greater the reduction of pressure in chamber 10 and the greater the decrease in level of mercury in chamber 9. Conversely, when the temperature of the tank 1 falls below normal, the motor 36 is energized to effect an opening movement of the valve and this movement is communicated to the piston 37 to increase the pressure in the chamber 10 to raise the level of the mercury in chamber 9, tending to reduce the speed of the motor or stop it. In brief, as soon as the temperature departs from normal, the motor 36 begins to operate at high speed to open or close the valve, as required to check further departure of the temperature from normal, and then the control system without waiting for a response of the detector 2, which would be delayed because of the time lag of the system, begins to decrease the rate of movement of the control valve. When the motor stops, the pressure in chamber 10 slowly returns to atmospheric. If the rate at which the condition is returning to normal does not equal this rate of equalization, the motor is again operated in one direction or the other to obtain a precise setting of the valve. Preferably, and as shown, the plunger 14 is hollow and provided with a small orifice 44 at the bottom and a vent 44a at the top. If the temperature changes slowly with corresponding slow movement of plunger 14 from one position to another, the change of level of the mercury in chamber 19, resulting from movement of plunger 14, is substantially less than when the plunger 14 is rapidly moved from one position to the other due to a rapid temperature change. With a slow change in temperature, the change of level in chamber 9 is less for a given departure from normal, and the slower the speed of the motor 36 in effecting a corrective adjustment of the control valve. At the slower speeds, the bleeder port 43 is more effective so that the operation of the valve at slow speed has less effect upon the pressure in chamber 10 and consequently upon the level of mercury in chamber 9.

The adjustment of the control valve 6, in response to a change in temperature of tank 1, is therefore affected by the extent of the departure, the rate of the departure and the rate of movement of the control valve, the concurrent magnitudes of the three control effects determining the speed of the motor 36 and also its direction of operation. With the arrangement shown, with the temperature above normal, requiring closing movement of the valve, if the valve is being closed too rapidly, the control system will function temporarily to stop or even reverse the motor 36. Conversely, with the temperature below normal and requiring open movement of the valve, the control system will stop or reverse the motor if the valve is being opened too rapidly. The control system thus adapts itself for all conditions of operation, operating the valve quickly when a rapid change of temperature occurs, and slowly for slow changes of temperature. In all cases, after movement of the valve, the control system waits for an interval and then, if the condition is not approaching normal at a desired rate, effects another movement of the valve.

The system shown in Fig. 2 is, in general, similar to that of Fig. 1 except that the detector is responsive to changes of ion concentration, and includes a mechanical relay for operating the plunger 14. Like reference characters have been used to identify corresponding parts of the two figures. The setting of the valve 6 controls the addition of a chemical to a liquid flowing in the conduit or trough 45 whose ion concentration it is desired to maintain at some predetermined value. Downstream with respect to pipe 7 is disposed the detector comprising electrodes 46 which developed a potential varying as a function of the ion concentration of the liquid in which they are immersed. As shown in Fig. 2a, these electrodes are connected to a potentiometer circuit including the slidewire S along which contact C is adjustable, and a galvanometer G responsive to any difference between the voltage generated by the ion concentration cell and the voltage across the effective portion of the slidewire selected by the contact C. Departure of the ion concentration of the treated fluid from normal causes the galvanometer G to deflect in one sense or the other, and this movement of the galvanometer is utilized, as now explained, to change the position of a cam 15, Fig. 2, which has the same general purpose as the cam 15 of Fig. 1. The mechanical relay for effecting movement of the cam in accordance with the galvanometer deflection, may be of any suitable type and, as shown in Fig. 2, may be of the type disclosed in Leeds Patent No. 1,125,699. The motor 21a drives the shaft 47 on which is disposed the cam 48 which intermittently rocks the frame 49 over which the end of the galvanometer pointer 50 extends. So long as the ion concentration is at the desired value, the pointer 50 remains at the position shown in Fig. 2. When, however, the ion concentration increases or decreases, the pointer 50 deflects to the right or left, depending upon the sense of the departure, to move beneath one or the other of the pivoted arms 51 so that when the frame 49 is rocked upwardly the pointer transmits the motion of the rocking frame 49 to the arm 51 engaged by the pointer. The resulting rocking movement of the arm 51 is transmitted to the driving clutch member 52 to rotate it about its pivot 53 to an extent depending upon the extent of the galvanometer deflection. Subsequently, in the cycle of operation, the cam 54 allows the driving clutch member 52, in its displaced position, to engage the driven clutch member 55 upon whose shaft 54 is disposed the disk SD carrying the slidewire S and also the cam 15. As the shaft 47 continues to rotate, one or the other of the cams 56 engages the driving clutch member 52 and swings it back to the neutral position shown in Fig. 2. Since, at this time, the two clutch members 52, 55 are in engagement, the shaft 54 is rotated in accordance with the sense and extent of deflection of the galvanometer G. This adjustment of the shaft 54 and of the slidewire S thereon may consist of one or more steps and continues until the potentiometer voltage balances the voltage developed by the ion concentration cell. The angle through which the shaft 54 and cam 15 is moved is consequently a function of the departure of the ion concentration from the desired magnitude.

The cam 22a (Fig. 3) on jack-shaft 47a (Figs. 2 and 3) effects reciprocation of the plunger 18 of the control device 8 at a suitable rate. The arm 57 engaged by cam 15 determines the position of the plunger 14a (Fig. 3) corresponding to plunger 14 of the control device 8 of Fig. 1. The operation of the system is the same as that of Fig. 1, and need not be repeated.

In actual practice, this system has been successfully used for sodium phenate neutralization in which the solution is very acid or quite alkaline unless the acid added is correct to within less than 0.1 per cent. and has maintained this high accuracy despite large and rapid changes of acid demand.

The apparatus of Fig. 2 may also be used to record the changes in magnitude of ion concentration. The recorder pen 58 is driven from the pulley 59 on the controlled shaft 54 so that its position with respect to the recorder chart 60 driven from motor 21a through suitable speed reducing mechanism is controlled by the galvanometer G through the mechanical relay mechanism.

The arrangement shown in Fig. 2 can be used to measure conditions other than ion concentration, for example, temperature, if a thermocouple, for example, is substituted for the ion concentration cell 46, the control valve or equivalent controlling the agent affecting the temperature to be controlled.

The control systems disclosed, in fact, have a host of applications, it being necessary only to use a detector suited for the condition under measurement, and a proper control element, as a valve, rheostat, or the like, for varying the agent which affects the magnitude of the condition.

As shown in Fig. 2b, another type of balanced network may be used for measurement of conditions whose change in magnitude can be translated into a change of resistance. For example, if desired to measure the conductivity of the fluid in the conduit 45 of Fig. 2, the electrodes 61 immersed in the fluid are included in one arm of a Wheatstone bridge which includes a slidewire S and galvanometer G. Preferably a source of alternating current is used and the galvanometer is of the alternating current type with its field coil properly phased. Change in conductivity of the solution upsets the balance of the bridge and the deflection of galvanometer G can be utilized as by mechanism shown in Fig. 2 to effect a rebalancing adjustment of the slide-wire contact C and to position the control cam 15.

The pump 62, Fig. 2, which is the equivalent of piston arrangement 37, Fig. 1, for producing a control effect whose magnitude is a function of the speed of movement of the control valve 6 or equivalent, is shown more clearly in Figs. 5 and 6. The drum 63 is driven by sprocket 64 and chain 65 concurrently with operation of the valve 6, the speed ratio being such that the drum 63 rotates through an angle of approximately or somewhat less than 180° for movement of valve 6 from full "on" to full "off". With the valve in its normal or intermediate position, the drum 63 is in the position shown in Fig. 6, and its internal partition 66, which divides the drum into two compartments 67, 68 is in the vertical position. The two compartments, which are partially filled with a liquid, preferably mercury, are isolated from each other except by the narrow slot or passage 69 at the bottom of the dividing plate 66. The compartment 68 is vented to atmosphere, as by the pipe 70, and the chamber 67 is connected by the pipe 71 to the chamber 10 of the control device 8. As apparent from Fig. 6, when the pump drum 63 is rotated in clockwise direction, suction or negative pressure is produced in the chamber 67 which is effective to decrease the pressure in chamber 10 of the control device to reduce the level of the mercury in the contact chamber 9 thereof. When the drum is rotated in a counterclockwise direction, the air in the chamber 67 above the mercury is compressed to increase the pressure in the chamber 10 of the control device, and therefore increase the level of the mercury in the contact chamber 9. The effect upon the mercury level in chamber 9 is, as in the system of Fig. 1, transitory since the pipe 71 is vented to atmosphere through the bleeder valve 43. In some installations it is possible to omit the lumped storage capacity 39 and 40, and orifice plate 42, or equivalent, because the distributed storage capacity and distributed resistance of the pipe 71 between the pump 62 or equivalent and the chamber 10 of the control device closely approximates the proper values.

Figures 3, 4:
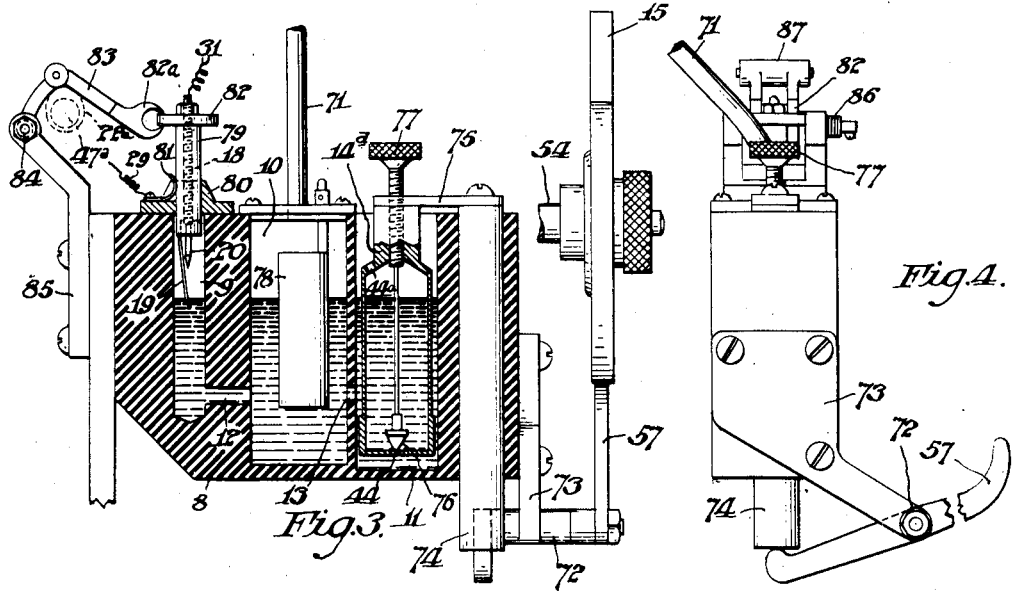
Fig. 3 is a detail view, on enlarged scale and in section, of control mechanism disclosed in Fig. 2.
Fig. 4 is an end view of Fig. 3.

The control device 8 of Fig. 2, though in general similar to that of Fig. 1, differs somewhat in its details of construction as clearly appears from Figs. 3 and 4. The arm 57 having one end in the path of movement of cam 15 is pivoted at 72 on the bracket 73 suitably held to and extending from the body of the control device. The other end of the arm bears against the guide rod 74 from whose upper end extends the bracket 75 from which the plunger 14a is suspended. The rate at which mercury flows through the port 44 in the bottom of the plunger 14a may be controlled by valve 76 whose position is adjustable by the knob 77 externally of the plunger. To facilitate adjustment of the control point, the normal level of the mercury is controlled by the displacer 78 whose position in the chamber 10 can be adjusted externally of the control device. The plunger assembly 18 consists of a metal sleeve 79 which is guided by the member 80, and which serves as a conductor between the contact 19 and the brush 81 to which the wire 29 of the control circuit is connected. The contact 20 extends through an insulating bushing inside of the sleeve 79. The washer 82 at the upper end of the plunger assembly is embraced by the yoke member 82a at the end of arm 83 which is pivoted at 84 to the bracket 85. The spring 86 so biases the arm that the roller 87 carried thereby remains in engagement with the periphery of the cam 22a of Fig. 2. Accordingly, as shaft 47 rotates, the plunger assembly carrying contacts 19 and 20 is reciprocated, as previously described.

Another modification of the invention is shown in Fig. 7. For convenience of explanation, it is assumed that it is desired to maintain constant the pressure of a fluid in a system having time lag. The pressure-responsive detector comprises the bellows 88 connected to the tank 1b containing the gas or liquid whose pressure is to be controlled. The end plate 89 of the bellows is connected to the end plate 90 of the bellows 91 of smaller volume, and whose interior is in communication with the interior of the bellows 88 through a pneumatic impedance such as the capillary tube 92. A nozzle 93 which is continuously supplied with fluid from pipe 94, is pivotally mounted on the bracket 95 for movement by the bellows system. Adjacent the path of movement of the nozzle 93 are disposed two orifices provided, for example, by pipes 96, 97, which are connected to opposite ends of the cylinder 98. The piston 99 therein is suitably connected to the control valve 6b in the intake pipe 7b to the tank 1b. When the tank-pressure is normal the parts are in the position shown, the biasing springs 100 centering the pipes 96, 97 with respect to the nozzle 93. Assuming that the pressure in tank 1b suddenly increases, the bellows 88 expands, moving nozzle 93 in counterclockwise direction to increase the pressure in cylinder 98 below the piston 99 which thereupon rises to move the valve 6b toward closed position. The movement of valve 6b is accompanied by upward movement of the plunger 37b in cylinder 38b to increase the pressure in the cylinder 10b which, after a time controlled by settings of valves 42 and 43, is effective to cause downward movement of the piston 101. The piston 101, connected by link 102 to the arm 103, moves the pipe or orifice 97 downwardly away from the nozzle 93 to cut off the supply of energy to the piston 99 and so stop movement of valve 6b. In the meantime, the bellows 91 has begun to expand and counteract the pressure in the bellows 88 so that the nozzle 93 slowly moves back towards its original position. The vent 43 permits the pressures acting on the piston 101 to be equalized so that eventually the arm 103 returns pipes 96 and 97 to their original position.

If the initial setting of the valve 6b in response to the primary control action is proper, the nozzle and the cooperating pipes 96 and 97 return at the same rate to their original positions, and no further movement of valve 6b results. If, however, the valve 6b has been closed too far, the nozzle 93 overtakes the pipe 96 and causes the piston 99 to open valve 6b. Conversely, if the pressures return to normal too slowly, the pipe 97 overtakes nozzle 93 and a further closure of the valve 6b results. Each movement of the valve is followed by a change in pressure in the chamber 10b to effect a change in position of arm 103 and temporarily stop further valve movement.

The pneumatic impedance 92 provides that the difference between the pressures in chambers 88 and 91 is a function of the rate of change in the magnitude of the controlled condition; specifically, if the pressure in tank 1b increases rapidly the pressure difference of chambers 88 and 91 is greater than for a slow increase of pressure in tank 1b.

Therefore, in this, as in the prior systems described, immediately upon the departure of the controlled condition from a desired magnitude, the control member is moved to greater or lesser extent, depending upon the magnitude and rate of change from normal; the control system then stops further operation of the valve, even though the detector is calling for further movement, for an interval of time comparable to, but not substantially exceeding the time lag of the system. During this interval, however, the control is effective to respond to any further change of the controlled condition either towards or from normal.

Use of the control arrangement of Fig. 7 is not, of course, limited to control of pressure or temperature, but is of general application.

In Fig. 8 there is disclosed a control system which, though essentially electrical in character, includes elements having the same general characteristics and mode of operation as the control systems of the preceding modifications. The control network includes the Wheatstone bridge N having a slidewire 104 along which is adjustable the contact 105 to pre-determine the normal magnitude of the condition to be controlled which, for purpose of illustration, as shown in Fig. 8, is the pressure or temperature of fluid within the tank 1c. Current may be supplied to the network N from any suitable source. In the particular system of Fig. 8, it receives direct current from the rectifier bridge B whose input terminals are connected to the secondary S1 of transformer T.

The contact 106 adjustable along the resistance 107 of the network N is suitably mechanically coupled to the temperature or pressure detecting device 108 which, as shown, may have a diaphragm 109. When the pressure is at the normal value, the bridge is balanced and there is no deflection of the galvanometer G. When, however, the pressure departs from normal, contact 106 is moved to unbalance the bridge and the galvanometer G deflects in one sense or the other, depending upon the sense of the departure. To effect energization of motor 36c for rotation of the valve or equivalent member 6c in the proper direction to restore normal temperature or pressure, a suitable relay is interposed between the galvanometer and the motor 36c because contacts capable of handling the motor current are too heavy to be actuated by a sensitive galvanometer system. Although any suitable relay arrangement may be utilized, the arrangement shown, utilizing grid-controlled rectifier tubes 110—111, has proved satisfactory. The grids of the tubes are connected, respectively, to the contacts 112, 113, adapted selectively to be engaged by the contact 114 actuatable by the galvanometer pointer or other part of the movable coil system. The grids of the tubes are connected, respectively, through resistances 115, 116 to the common return conductor 117 which is connected to the cathodes of the tubes. The cathodes of the tubes are connected to one side of the alternating current 119, while the other line conductor 118 is connected to the motor 36c whose field coils R and L are connected, respectively, to the anodes of the tubes 110 and 111.

When the galvanometer G is in neutral position as shown, the phase relations of the grid and anode voltages of the two tubes are such that no current flows through the motor. When, however, the galvanometer deflects in one direction or the other to engage one or the other of the contacts 112, 113, one of the condensers 120 is connected between the grid of one of the tubes and the supply line 118 to change the phase relation of the grid and plate voltages of the tube so that current flows through the motor armature and one or the other of the field coils L, R. The motor thereupon moves the valve 6c in proper direction to return the pressure in tank 1c toward normal.

As the motor adjusts the control valve 6c, it concurrently temporarily changes the value of a resistance in the network N. Specifically, in the arrangement shown, the cam 121 operates the bellows 122 to change the pressure in the chamber 123 of a liquid resistance device comprising two chambers 124, 125 containing mercury and communicating with the chamber 123. The conductors 126, 127 extend into the mercury in the columns 124, 125 to form, in effect, a resistance in series in the lower arm of the network between galvanometer G and slidewire 107 and whose magnitude, upon operation of the motor, either increases or decreases depending upon direction of the motor and to greater or less extent, depending upon the motor speed. The bleeder valve 43c permits the pressure in the pneumatic system to return to normal when the motor stops and also insures that the pressure which determines the level of the mercury in the columns 124, 125 is a function of the rate of adjustment of the control valve 6c.

Assuming that there has been a rapid departure from normal, the bridge N is unbalanced, whereupon galvanometer G operates the motor to effect a corrective adjustment of the valve. The operation of the valve builds up a pressure which acts upon the liquid resistance to rebalance the network, even though the contact 106 is in its displaced position, and thus to stop the motor at least temporarily. As the air slowly leaks out or into the chamber 123 through valve 43c, the liquid resistance is changed. If the temperature or pressure of tank 1c approaches normal at such rate that the movement of contact 106 is compensated by the change of the liquid resistance, the network N remains balanced and no further adjustment of the valve occurs. If the magnitude of the liquid resistance changes more rapidly than the rate at which temperature is approaching normal, the network is again unbalanced in the same sense as before and a further corrective adjustment of the valve is effected. On the contrary, assuming the temperature is high but is approaching normal value too rapidly, the network is unbalanced in an opposite sense to open the valve 6c, even though the temperature is still above normal, in order to check the too rapid change.

While I have illustrated and described various modifications and their application to control specific conditions, it is to be understood my invention is not limited thereto, but is coextensive in scope with the appended claims.

What I claim is:

1. In a system including a control member for varying application of an agent affecting the magnitude of a condition, the method of operation which comprises producing a control effect of magnitude determined by the rate of departure of the magnitude of said condition from normal, adjusting said control member in proper sense to return the magnitude of said condition toward normal, and at a rate determined by the magnitude of said control effect, producing a second control effect of magnitude determined by the rate of adjustment of said control member, and controlling further adjustment of said control member in accordance with the concurrent magnitudes of said control effects.

2. In a system including a control member for varying application of an agent affecting the magnitude of a condition, the method of operation which comprises producing a control effect of magnitude determined by the extent of departure of the magnitude of said condition from normal, producing a second control effect of magnitude determined by the rate of change of said condition, adjusting said control member in proper sense to return the magnitude of said condition toward normal, producing a third control effect of magnitude determined by the rate of adjustment of said control member, and controlling the rate of adjustment of said control member in accordance with the concurrent magnitudes of the three control effects.

3. In a system including a control member for varying application of an agent affecting the magnitude of a condition, the method of operation which comprises moving said member, producing a control effect which varies as a function of the extent and rate of change of said condition, moving said member in accordance with the magnitude and sense of said control effect, producing a second control effect, by movement of said member, which varies as a function of the sense and rate of movement of said member, and controlling further movement of said member in accordance with the concurrent magnitudes of said control effects.

4. In a system including a control member for varying application of an agent affecting the magnitude of a condition, the method of operation which comprises, upon departure of the magnitude of said condition from normal, adjusting said control member in proper sense to oppose further departure and at a rate varying as a function of the extent and rate of the departure, and after a time delay, less than the time lag of the system, applying a force produced by movement of said member to inhibit further adjustment, in response to said departure, for a period comparable to but not substantially exceeding the time lag of the system.

5. In a system including a control member for varying application of an agent affecting the magnitude of a condition, the method of operation which comprises upon departure of the condition from normal, intermittently moving the member by increments whose magnitude is initially a function of the extent of the departure, producing a control effect whose magnitude is a function of the rate of adjustment of said member, and after a time less than the time lag of said system, modifying the magnitudes of the incremental adjustments of said member in accordance with the magnitude of said control effect.

6. In a system including a control member for varying application of an agent affecting the magnitude of a condition, the method of operation which comprises upon departure of the condition from normal producing intermittent control impulses of magnitude initially determined by the extent and rate of said departure, moving the control member at a rate which is a function of the magnitude of said control impulses, producing a control effect whose magnitude is a function of the rate of movement of said member, and after a time less than the time lag of said system, utilizing said control effect to modify the sense and magnitude of said control impulses.

7. In a system including a control member for varying application of an agent affecting the magnitude of a condition, the method of operation which comprises upon sudden departure of the magnitude of the condition from normal, producing a control effect of substantial magnitude, moving said control member initially at high rate and in accordance with the magnitude of said control effect, gradually reducing said control effect independently of the operation of said member, producing a second control effect of magnitude determined by the rate of movement of said member, and after a time less than the time lag of the system, utilizing said second control effect further to modify the magnitude of said first control effect.

8. In a system including a control member for varying application of an agent affecting the magnitude of a condition, the method of operation which comprises upon sudden departure of the magnitude of the condition from normal, producing a control effect of substantial magnitude, moving said control member initially at high rate and in accordance with the magnitude of said control effect, gradually reducing said control effect independently of the operation of said member, producing a second control effect of magnitude determined by the rate of movement of said member, and after a time less than the time lag of the system, utilizing said second control effect to determine the effective sense and magnitude of said first control effect.

9. Control apparatus for a system having appreciable time lag comprising a detector responsive to changes in magnitude of a condition of operation of said system, a control member adjustable to control the magnitude of said condition, motive means for actuating said control member, means for controlling the operation of said motive means comprising means operable by said detector to produce a control effect of magnitude varying as a function of the extent and rate of change of said condition, and means responsive to operation of said control member to produce a control effect in opposition to said first control effect and whose magnitude is a function of the speed of adjustment of said control member.

10. Control apparatus for a system having appreciable time lag comprising a detector responsive to changes in magnitude of a condition of operation of said system, a control member adjustable to control the magnitude of said condition, motive means for actuating said control means, means for controlling the operation of said motive means comprising means operable by said detector to produce a control effect of magnitude varying as a function of the extent and rate of change of said condition, means responsive to operation of said control member to produce a control effect in opposition to said first control effect and whose magnitude is a function of the speed of adjustment of said control member, and means for delaying the application of said second control effect for a period less than the time lag of said system.

11. Control apparatus for a system comprising a control member adjustable to control the magnitude of a condition of operation of said system, motive means for actuating said control member, means for controlling the operation of said motive means comprising a system containing a liquid, means responsive to change in level of said liquid for energizing said motive means, means responsive to a change in magnitude of said condition for changing the level of said liquid, and means responsive to operation of said control member for varying the level of said liquid in opposite sense.

12. Control apparatus for a system comprising a control member adjustable to control the magnitude of a condition of operation of said system, motive means for actuating said control member, and means for controlling the operation of said motive means comprising a system containing a liquid, means responsive to change in level of said liquid for energizing said motive means, means responsive to a change in magnitude of said condition to vary the level of said liquid in accordance with the extent of said change, and means responsive to the operation of said control member for varying the level of said liquid in opposite sense and to an extent determined by the rate of adjustment of said member.

13. Control apparatus for a system comprising a control member adjustable to control the magnitude of a condition of operation of said system, motive means for actuating said control member, and means for controlling the operation of said motive means comprising a system containing a liquid, means responsive to change in level of said liquid for energizing said motive means, means responsive to a change in magnitude of said condition to vary the level of said liquid in accordance with the extent and rate of said change, and means responsive to the operation of said control member for varying the level of said liquid in opposite sense and to an extent determined by the rate of adjustment of said member.

14. Control apparatus for a system having appreciable time lag comprising a control member adjustable to control the magnitude of a condition of operation of said system, motive means for actuating said control member, means for controlling the operation of said motive means comprising a system containing a liquid, means responsive to change in level of said liquid for energizing said motive means, means responsive to a change in magnitude of said condition for changing the level of said liquid, means responsive to operation of said control member for varying the level of said liquid in opposite sense, and means for delaying the action of said last-named means for a period less than the time lag of the system.

15. Control apparatus for a system comprising a control member adjustable to vary the magnitude of a condition of operation of said system, motive means for actuating said control member, means for controlling the operation of said motive means comprising a conductive liquid, contacts for controlling the energization and direction of movement of said motive means, means for moving said contacts to maintain one of them continuously out of engagement with said liquid at normal level and the other continuously in engagement with said liquid at normal level, and means responsive to change in magnitude of said condition for varying the level of said fluid.

16. Control apparatus for a system comprising a control member adjustable to vary the magnitude of a condition of operation of said system, motive means for actuating said control member, and means for controlling the operation of said motive means comprising a conductive liquid, contacts for controlling the energization and direction of movement of said motive means, means for moving said contacts to maintain one of them continuously out of engagement with said liquid at normal level and the other continuously in engagement with said liquid at normal level, means responsive to change in magnitude of said condition for varying the level of said fluid, and means responsive to operation of said control member for varying the level of said liquid.

17. Control apparatus for a system having appreciable time lag comprising a control member adjustable to vary the magnitude of a condition of operation of said system, motive means for actuating said control member, and means for controlling the operation of said motive means comprising a normally balanced control means, means responsive to a change in magnitude of said condition for unbalancing said control means, means to effect operation of said motive means in response to unbalance of said control means, and means responsive to operation of said control member to rebalance said control means within a period less than the time lag of said system.

18. Control apparatus for a system having appreciable time lag comprising a control member adjustable to vary the magnitude of a condition of operation of said system, motive means for controlling the operation of said control member comprising a normally balanced electrical network, means responsive to a change in magnitude of said condition to unbalance said network, means responsive to unbalance of said network to effect operation of said motive means, and means responsive to operation of said control member to deenergize said motive means within a period less than the time lag of said system.

19. Control apparatus for a system having appreciable time lag comprising a control member adjustable to vary the magnitude of a condition of operation of said system, motive means for actuating said control member, means for controlling the operation of said motive means comprising a normally balanced electrical network, means responsive to a change in magnitude of said condition for unbalancing said network, a normally balanced control means for controlling the energization of said motive means, means operated upon unbalance of said network to unbalance said control means, and means responsive to operation of said control member to rebalance said control means within a period less than the time lag of said system.

20. Control apparatus for a system having appreciable time lag comprising a control member adjustable to vary the magnitude of a condition of operation of said system, motive means for actuating said control member, means for controlling the operation of said motive means comprising a normally balanced electrical network, means responsive to change in magnitude of said condition for unbalancing said network, a control device comprising a chamber containing a conductive liquid, contacts for controlling said motive means, means for moving said contacts in a path such that for normal level of said liquid one of said contacts is continuously out of engagement with the liquid and the other is continuously in engagement with the liquid, means responsive to unbalance of said network for varying the level of said liquid, and time delay means responsive to operation of said control member for varying the level of said liquid.

21. Control apparatus for a system having appreciable time lag comprising a control member adjustable to vary the magnitude of a condition of operation of said system, motive means for actuating said control member, and means for controlling the operation of said motive means comprising a normally balanced control means, means responsive to a change in magnitude and the rate of change in magitude of said condition for unbalancing said control means, means to effect operation of said motive means in response to unbalance of said control means, and means responsive to operation of said control member to rebalance said control means within a period less than the time lag of said system.

JOHN J. GREBE.